United States Patent
DiZio et al.

(10) Patent No.: US 7,253,241 B2
(45) Date of Patent: Aug. 7, 2007

(54) FLUOROCHEMICAL CONTAINING LOW ADHESION BACKSIZE

(75) Inventors: James P. DiZio, St. Paul, MN (US); David J. Kinning, Woodbury, MN (US); George G. I. Moore, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 211 days.

(21) Appl. No.: 11/027,602

(22) Filed: Dec. 28, 2004

(65) Prior Publication Data

US 2006/0141246 A1    Jun. 29, 2006

(51) Int. Cl.
    C08F 18/20    (2006.01)
    C08F 20/22    (2006.01)
(52) U.S. Cl. .............. 526/245; 526/242; 526/243; 526/248; 526/286; 526/288; 526/318.4; 526/318.44; 526/329.3; 526/329.4; 526/342
(58) Field of Classification Search ............... 526/242, 526/243, 245, 248, 286, 288, 318.4, 329.3, 526/329.4, 342, 318.44
See application file for complete search history.

(56) References Cited

U.S. PATENT DOCUMENTS

| | | | |
|---|---|---|---|
| 3,011,988 A | 12/1961 | Luedke et al. | |
| 3,282,905 A | 11/1966 | Fasick et al. | |
| 3,318,852 A | 5/1967 | Dixon | |
| 3,378,609 A | 4/1968 | Fasick et al. | |
| 3,398,182 A | 8/1968 | Guenthner et al. | |
| 3,413,226 A | 11/1968 | Coleman | |
| 3,455,889 A | 7/1969 | Coleman | |
| 4,321,404 A | 3/1982 | Williams et al. | |
| 4,366,300 A | 12/1982 | Delescluse | |
| 4,513,059 A | 4/1985 | Dabroski | |
| 4,792,444 A | 12/1988 | Fukasawa et al. | |
| 4,920,190 A | 4/1990 | Lina et al. | |
| 5,093,398 A | 3/1992 | Rottger et al. | |
| 5,115,059 A | 5/1992 | Le | |
| 5,144,056 A | 9/1992 | Lina et al. | |
| 5,173,547 A | 12/1992 | Rottger et al. | |
| 5,446,118 A | 8/1995 | Shen et al. | |
| 5,646,222 A * | 7/1997 | Maekawa et al. ........... 526/243 |
| 5,725,789 A | 3/1998 | Huber et al. | |
| 5,872,180 A | 2/1999 | Michels et al. | |
| 5,883,175 A | 3/1999 | Kubo et al. | |
| 6,001,923 A | 12/1999 | Moncur et al. | |
| 6,048,952 A * | 4/2000 | Behr et al. ........... 526/245 |
| 6,114,045 A | 9/2000 | Juhue et al. | |
| 6,121,143 A | 9/2000 | Messner et al. | |
| 6,238,798 B1 | 5/2001 | Kang et al. | |
| 6,265,060 B1 | 7/2001 | Arudi et al. | |
| 6,482,911 B1 | 11/2002 | Jariwala et al. | |
| 6,500,439 B1 | 12/2002 | Morita et al. | |
| 6,664,354 B2 | 12/2003 | Savu et al. | |
| 6,750,277 B1 | 6/2004 | Yamana et al. | |
| 6,803,109 B2 | 10/2004 | Qiu et al. | |
| 6,890,360 B2 | 5/2005 | Cote et al. | |
| 6,894,106 B2 * | 5/2005 | Aga et al. ........... 524/544 |
| 6,939,580 B2 | 9/2005 | Enomoto et al. | |
| 2003/0026997 A1 | 2/2003 | Qiu et al. | |
| 2003/0083448 A1 | 5/2003 | Fan et al. | |
| 2003/0130457 A1 | 7/2003 | Maekawa et al. | |
| 2004/0147188 A1 | 7/2004 | Johnson et al. | |
| 2005/0106326 A1 | 5/2005 | Audenaert et al. | |

FOREIGN PATENT DOCUMENTS

| | | |
|---|---|---|
| EP | 0 225 826 | 6/1987 |
| EP | 0 712 046 | 5/1996 |
| EP | 0 849 392 A2 | 6/1998 |
| EP | 1 329 548 | 7/2003 |
| EP | 1 380 628 A1 | 1/2004 |
| FR | 1 468 301 | 2/1967 |
| GB | 870022 | 6/1961 |
| JP | 61-148208 | 7/1986 |
| WO | WO 97/14842 | 4/1997 |
| WO | WO 03/048224 A1 | 6/2003 |
| WO | WO 03/062521 A1 | 7/2003 |
| WO | WO 2005/065164 A2 | 7/2005 |
| WO | WO 2005/066224 | 7/2005 |

OTHER PUBLICATIONS

U.S. Appl. No. 11/027,604, filed Dec. 28, 2004, entitled "Water- and Oil-Repellent Fluoroacrylates".

(Continued)

*Primary Examiner*—Helen L Pezzuto

(57) ABSTRACT

In one aspect, the invention provides a water-based release coating composition comprising a mixture of (A.) from about 5 to about 100 wt % of a polymer comprising the reaction product of (a.) from 1 to about 15 wt % of a fluorinated monomer selected from the group consisting of monomers according to the general formula:

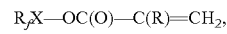

wherein $R_f$ represents a perfluorinated aliphatic group having 3 or 4 carbon atoms, X is an organic divalent linking group, and R represents a hydrogen or methyl group, (b.) from about 40 to about 70 wt % of an alkyl (meth)acrylate, wherein the alkyl group contains from 16 to 22 carbon atoms, (c.) from about 3 to about 20 wt % of (meth)acrylic acid, (d.) from about 20 to about 40 wt % acrylonitrile, and (e.) from 0 to about 15 wt % of vinyl monomer, other than acrylonitrile, wherein the sum of (a.) through (e.) equals 100%; and (B.) from 0 to about 95 wt % of an extender polymer, wherein the sum of (A.) and (B.) is 100% and wt % is based on the total amount of solids in the composition.

10 Claims, No Drawings

OTHER PUBLICATIONS

U.S. Appl. No. 11/027,633, filed Dec. 28, 2004, entitled "Water- and Oil-Repellent Fluorourethanes and Fluoroureas".

U.S. Appl. No. 11/027,612, filed Dec. 28, 2004, entitled "Fluoroacrylate-Multifunctional Acrylate Copolymer Compositions".

U.S. Appl. No. 11/027,605, filed Dec. 28, 2004, entitled "Durable High Index Nanocomposites for AR Coatings".

U.S. Appl. No. 11/027,606, filed Dec. 28, 2004, entitled "Water-Based Release Coating Containing Fluorochemical".

* cited by examiner

FLUOROCHEMICAL CONTAINING LOW ADHESION BACKSIZE

BACKGROUND

The invention relates to release compositions useful in release layers of release articles (e.g., release liners) and adhesive articles (e.g., pressure sensitive adhesive tapes (PSA)).

Polymeric release materials are known to be used in release layers in release articles (e.g., release liners) and adhesive articles (e.g., adhesive tapes) in order to provide a surface from which an adhesive can be easily and cleanly removed. For example, it is known to apply a polymeric release material to the back surface of an adhesive tape (e.g., masking tape) in order to allow the tape to be provided in roll form and to be easily and conveniently dispensed by unwinding the roll. The release coating is expected to reproducibly provide an appropriate unwind force throughout the lifetime of the tape roll, and to not deleteriously affect the adhesive.

The *Handbook of Pressure Sensitive Adhesive Technology*, $2^{nd}$ Ed., D. Satas Ed., Van Nostrand Reinhold, N.Y., 1989, Chapter 23, describes polymers which may be used as release agents for PSA tapes. Various polymers of lower critical surface tension such as silicones, fluorine containing polymers, and long alkyl side chain polymers are useful as release coatings. Long alkyl side chain polymers generally contain 16-20 carbon atoms in the alkyl side chains, and can be used to prepare release coatings that provide medium release forces which are especially desirable for PSA tapes. For example, GB 870,022 describes the use of copolymers prepared from octadecyl acrylate, acrylonitrile, acrylic acid, and methyl acrylate for tape release coatings.

The use of polymers or copolymers containing fluoroalkyl side groups has also been disclosed (U.S. Pat. No. 3,318,852). It has been found that the perfluoroalkyl groups need to contain at least 6 carbon atoms, and preferably at least 8 carbon atoms, in order for the polymer to provide sufficiently low unwind forces for tape rolls. However, it has been reported that certain perfluorooctyl-containing compounds may tend to bioacummulate in living organisms, raising concerns about their use. Recently, it has been found that perfluorobutyl-containing compounds are eliminated from the body much more effectively.

In the case of masking tapes, the release coating is expected to provide moderate unwind force, between about 10-40 N/dm. If the unwind force is too low, the tape roll may inadvertently unwind under its own weight, and if the unwind force is too high, the tape roll will be difficult to unwind. In addition, the unwind force should be relatively stable over the lifetime of the roll. Another common requirement for masking tapes is that the release coating on the tape backside should provide good wetting and anchorage of both water and solvent based paints. Poor paint wetting and anchorage can result in paint flaking when the masking tape is removed from the substrate, thereby ruining the appearance of the freshly painted surface. Still another common requirement for masking tapes is that they have good holding power to their own backing. For example, in a paint-draping situation, one piece of masking tape may be used to attach a drape onto another piece of masking tape, that is, overtaping, that had been placed onto the surface to establish a paint line. Typically, improving one of these masking tape property requirements can result in a deterioration of another property. For example, in the case of a more aggressive PSA, a release coating that can provide easier and more stable release must be employed; however, such release coatings may not provide good paint wetting/anchorage or sufficient holding power to backing. In such cases, a compromise in overall release coating performance features must be reached.

One commonly used method of forming a release layer is to coat the release material from an organic solvent-based solution onto a substrate. After the solution has been applied to the substrate, the solvent is evaporated leaving behind a relatively uniform coating of the release material. As environmental regulations tighten, release materials that can be processed using organic solvent-free processes are more desirable.

SUMMARY

In one aspect, the invention provides a water-based release coating composition comprising a mixture of A. from about 5 to about 100 wt % of a polymer comprising the reaction product of
  a. from 1 to about 15 wt % of a fluorinated monomer selected from the group consisting of monomers according to the general formula:

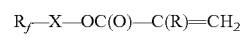

wherein $R_f$ represents a perfluorinated aliphatic group having 3 or 4 carbon atoms, X is an organic divalent linking group, and R represents a hydrogen or methyl group,
  b. from about 40 to about 70 wt % of an alkyl (meth)acrylate, wherein the alkyl group contains from 16 to 22 carbon atoms,
  c. from about 3 to about 20 wt % of (meth)acrylic acid,
  d. from about 20 to about 40 wt % acrylonitrile, and
  e. from 0 to about 15 wt % of vinyl monomer, other than those of a. through d., wherein the sum of a. through e. equals 100%; and B. from 0 to about 95 wt % of an extender polymer, wherein the sum of A. and B. is 100% and weight percent is based on the total amount of solids in the composition.

In another aspect, the invention provides an adhesive article comprising a backing having first and second surfaces, an adhesive on at least a portion of the first surface of the backing, and a water-based release composition as described herein on at least a portion of the second surface of the backing.

DETAILED DESCRIPTION

As used herein:

"(meth)acrylic or (meth)acrylate" refers to both acrylic or acrylate monomers and methacrylic/methacrylate monomers.

Surprisingly, it has been found that the copolymerization of relatively small amounts of fluorochemical comonomers, having short 3-4 carbon perfluoroalkyl groups, into alkyl (meth)acrylate based release polymers has been found to provide improved holding power to backing without significantly increasing the release force or sacrificing paint wetting or paint flaking resistance. Such release polymers are therefore ideal for use as masking tape release coatings.

Holding power to backing failures tend to be a low rate peel phenomenon, therefore increasing the peel force provided by the release coating at low peel rates results in improved holding power to backing performance.

Blending of the release polymer with an inexpensive polymer emulsion extender is an option to further improve tape properties, such as paint wetting and flaking resistance, and to lower the cost of the release coating.

Some of the advantages of the water-based release compositions of the invention include that the compositions:

If the above fluorinated monomer concentrations are too high, the release force may become excessive, and paint wetting and flaking resistance can suffer.

Another specific example is shown below as formula II:

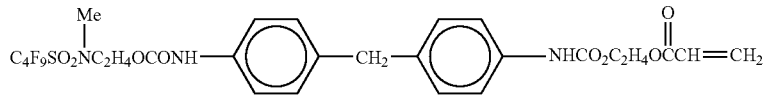

maintain desired release force; permit adhesives to exhibit relatively high peel forces at relatively low peel rates leading to improved overtaping and holding power to backing; provide good paint wetting and paint flaking resistance; and maintain re-adhesion strength with little or no release composition transfer to the adhesive.

The water-based release compositions of the invention contain (A.) from about 5 to about 100, in another embodiment, 15 to 50, wt % of a polymer or copolymer comprising the reaction product of (a.) from about 1 to about 15, in other embodiments, 10 to 15, 1 to 10, 5 to 10, and 1 to 5, wt % of a fluorinated monomer selected from the group consisting of monomers according to the general formula I:

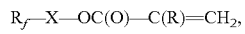

wherein $R_f$ represents a perfluorinated aliphatic group having 3 or 4 carbon atoms, X is an organic divalent linking group, and R represents a hydrogen or methyl group, (b.) about 40 to about 70, in other embodiments, 45 to 60, wt % alkyl (meth)acrylate, wherein the alkyl group contains from 16 to 22 carbon atoms, (c.) from about 3 to about 20, in other embodiments, 8 to 12, wt % of (meth)acrylic acid, (d.) from about 20 to about 40, in other embodiments, 25 to 35, wt % acrylonitrile, and (e.) from 0 to about 15 wt % of vinyl monomer, other than those of (a.) through (d.) above, wherein the sum of (a.) through (e.) equals 100%.

The fluorinated monomer can be described generally as having the formula I: $R_f$—X—OC(O)—C(R)=CH$_2$, wherein $R_f$ represents a perfluorinated aliphatic group having 3 or 4 carbon atoms, X is an organic divalent linking group, and R represents a hydrogen or methyl group.

The linking group X links the perfluoroaliphatic group $R_f$ to the free radically polymerizable group. Linking group X is generally non fluorinated and in some embodiments, contains from 1 to about 20 carbon atoms. X can optionally contain oxygen, nitrogen, or sulfur containing groups or a combination thereof, and X is free of functional groups that substantially interfere with free-radical polymerization (for example, polymerizable olefinic double bonds, thiols, and other such functionality known to those skilled in the art). Examples of suitable linking groups X include straight chain, branched chain or cyclic alkylene, arylene, aralkylene, sulfonyl, sulfoxy, sulfonamide, carbonamido, carbonyloxy, urethanylene, ureylene, and combinations thereof such as sulfonamidoalkylene.

Specific examples of fluorinated monomers include:
CF$_3$CF$_2$CF$_2$CF$_2$CH$_2$CH$_2$OCOCR$^1$=CH$_2$;
CF$_3$CF$_2$CF$_2$CF$_2$CH$_2$OCOCR$^1$=CH$_2$;
CF$_3$CF$_2$CF$_2$CF$_2$SO$_2$N(CH$_3$)CH$_2$CH$_2$OCOCR$^1$=CH$_2$;
CF$_3$CF$_2$CF$_2$CF$_2$SO$_2$N(C$_2$H$_5$)CH$_2$CH$_2$OCOCR$^1$=CH$_2$;
CF$_3$CF$_2$CF$_2$CF$_2$SO$_2$N(CH$_3$)CH$_2$CH(CH$_3$)OCOCR$^1$=CH$_2$;
and (CF$_3$)$_2$CFCF$_2$SO$_2$N(CH$_3$)CH$_2$CH$_2$OCOCR$^1$=CH$_2$,
wherein R$^1$ is hydrogen or methyl.

as described in U.S. Pat. No. 7,199,197.

If the above fluorinated monomer concentrations of formula II are too high, the release force may become too low, and paint wetting and flaking resistance can suffer.

Fluorinated monomer concentrations of less than 1% in polymer A do not result in a significant increase in holding power to the backing (i.e., increase in peel force at low peel rates).

Examples of useful (b.) alkyl (meth)acrylates, wherein the alkyl group contains from 16 to 22 carbon atoms, include octadecyl acrylate, octadecyl methacrylate, and behenyl acrylate and combinations thereof.

Examples of useful (e.) other vinyl monomers which may be copolymerized in small amounts into the copolymer include alkyl (meth)acrylates, wherein the alkyl group contains from 1 to about 8 carbon atoms, including methyl (meth)acrylate, butyl (meth)acrylate, iso-octyl (meth)acrylate, 2-ethylhexyl (meth)acrylate and combinations thereof. Additional examples of other vinyl monomers include styrene and vinyl acetate and combinations thereof.

The water-based release compositions of the invention contain (B.) from 0 to about 95, in another embodiment, 50 to 85, wt % of extender polymer. Extender polymers tend to reduce cost while improving paint wetting and flaking resistance. Useful extender polymers are in the form of polymeric emulsions. Examples of suitable polymer emulsions include those based on polyvinyl acetate (e.g., VINAC 884 available from Air Products Inc., Allentown, Pa.), vinyl acetate/ethylene copolymers (e.g., AIRFLEX 100HS, also available from Air Products), acrylic polymers (e.g., HYCAR 26138 available from Noveon Inc., Cleveland, OH, and RHOPLEX GL-618 available from Rohm & Haas, Philadelphia, Pa.), and styrene/acrylic copolymers (e.g., VANCRYL 989 available from Air Products) and combinations thereof.

Alkyl (meth)acrylate concentrations of less than 40 wt % and acrylonitrile concentrations of less than 20 wt % in polymer (A.) may result in release forces that are higher than desired. Alkyl (meth)acrylate concentrations higher than 70 wt % and acrylonitrile concentrations of higher than 35 wt % can result in poor paint wetting and poor paint flaking resistance. In addition, such compositions are difficult to invert into water. Inversion of similar compositions are described in U.S. Pat. No. 3,011,988.

Poymers havinfa (meth) acrylic acid content of less than 3% are difficult to invert into water, while higher (meth) acrylic acid content can increase the polymer's hydrophilicity, resulting in poor release stability under high humidity conditions.

Extender polymer concentrations beyond about 95 wt % can increase the release force and any tape roll could be difficult to unwind.

The release compositions of the present invention may contain other additives such as wetting agents and defoamers.

Adhesives

Adhesives useful in the present invention as the adhesive layer are preferably pressure sensitive adhesives. They are normally tacky at room temperature and can be adhered to a surface by application of, at most, light finger pressure.

The adhesives useful in the invention may generally be based on general compositions of polyacrylate; polyvinyl ether; rubber such as natural rubber; polyisoprene; polychloroprene; butyl rubber; polyisobutylene; butadiene-acrylonitrile polymer, thermoplastic elastomer, and styrene-butadiene polymer; poly-alpha-olefin; amorphous polyolefin; silicone; ethylene-containing copolymer such as ethylene vinyl acetate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, curatives, and solvents.

A general description of useful pressure-sensitive adhesives may be found in Encyclopedia of Polymer Science and Engineering, Vol. 13, Wiley-Interscience Publishers (New York, 1988) and Encyclopedia of Polymer Science and Technology, Vol. 1, Interscience Publishers (New York, 1964).

Additional description of useful pressure-sensitive adhesives may be found in Handbook of Pressure Sensitive Adhesive Technology, Second Edition, Van Nostrand Reinhold Publishers (New York, 1989).

For masking tapes, pressure sensitive adhesives based on tackified natural rubber are often desired.

Backings

Backings suitable for use with the release coatings of the invention may be utilized in the practice of the present invention. Such backing can be treated or untreated paper such as crepe, rope tissue, repulpable tissue, and kraft; woven fabric such as cotton, rayon, polyester, glass, and nylon; polymeric film such as cellophane, acetate, polyester, vinyl, polyvinyl chloride, polypropylene, polyethylene, and polyimide; nonwoven fabric such as a polymer scrim or web; foil such as aluminum, stainless steel, and lead; foam such as open and closed cell polyethylene, polyvinyl chloride, polyurethane, and polychloroprene; rubber, such as neoprene; metallized film, or combinations of the above, i.e., laminates. The backings can be compounded further with fibers, fillers, plasticizers, pigments, stabilizers, antioxidants, or mixtures thereof. The backings may be a single layer or of multilayer construction.

The backings may additionally bear a primer layer or be surface treated, e.g., corona treated, to promote adhesion of other components to it.

For example, crepe paper backings used for masking tapes may be coated with a barrier layer prior to application of the release layer. An example of a barrier coat includes RHOPLEX GL-618 acrylic polymer emulsion, commercially available from Rohm & Haas, Philadelphia, Pa. In addition, a primer layer may be applied onto the other side of the crepe paper to improve adhesion of the adhesive to backing.

Release coating compositions of the invention can be applied to suitable backings by conventional coating techniques such as, for example, wire-wound rod, direct gravure, offset gravure, reverse roll, air-knife, and trailing blade coating. Generally, the coatable compositions of the invention may contain from about 1 to about 15 percent by weight solids in water.

The adhesive articles of the invention generally comprise an adhesive composition on at least a portion of one surface of a backing and a water-based release composition on at least a portion of the other surface of the backing. The adhesive articles of the invention may be in the form of a sheet, multilayer sheets or stack or pad of sheets, or in the form of a roll, for example, a tape roll.

EXAMPLES

These examples are merely for illustrative purposes only and are not meant to be limiting on the scope of the appended claims. All parts, percentages, ratios, etc. in the examples and the rest of the specification are by weight unless indicated otherwise.

| Table of Abbreviations | |
|---|---|
| VAZO 67 | 2,2'-azobis(2-methylbutyronitrile), available from E. I. DuPont de Nemours and Company, Wilmington, DE |
| AIRFLEX 100HS | Vinyl acetate-ethylene copolymer emulsion, 55% solids content, Tg 7° C., pH 5.5, available from Air Products and Chemicals, Inc., Allentown, PA |
| ODA | Octadecyl acrylate, available from Sigma-Aldrich, Milwaukee, WI |
| ACN | Acrylonitrile, available from Sigma-Aldrich |
| AA | Acrylic acid, available from Sigma-Aldrich |
| MA | Methyl acrylate, available from Sigma-Aldrich |
| AP-1 | 58/29/10/3 wt % ODA/ACN/AA/MA copolymer, prepared as described in Comparative Example 1 below |
| MeFBSEA | N-methyl perfluorobutanesulfonamidoethyl acrylate, $C_4F_9SO_2N(CH_3)CH_2CH_2OC(=O)CH=CH_2$, prepared as described in U.S. Pat. No. 6,664,354 (Savu et al.), Example 2 Parts A and B |
| MeFBSEMA | N-methyl perfluorobutanesulfonamidoethyl methacrylate, $C_4F_9SO_2N(CH_3)CH_2CH_2OC(=O)C(CH_3)=CH_2$, prepared as described in U.S. Pat. No. 6,664,354 (Savu et al.), Example 2 Parts A and B, except using methacrylic acid instead of acrylic acid |
| FC-1 | 45/27/10/3/15 wt % ODA/ACN/AA/MA/MeFBSEA copolymer, prepared as described in Example 1 below |
| FC-2 | 50/27/10/3/10 wt % ODA/ACN/AA/MA/MeFBSEMA copolymer, prepared as described in Example 2 below |
| KC S-90104 paper | Fine-structured crepe paper pre-saturated with SBR based saturant, total basis wt. 76 g/sq m, available from Kimberly Clark Corp., Rosewell, GA |
| RHOPLEX GL-618 | Acrylic elastomeric polymer emulsion, 47% solids, available from Rhom & Haas, Philadelphia, PA |
| SILWET L-77 | Polyalkylene oxide modified polydimethylsiloxane, available from Setre Chemical Company, Memphis, TN |
| Tape 1 | 233 Masking Tape, available from 3M Company, St. Paul, MN |
| Tape 2 | 410 Double sided Tape, available from 3M Company |
| PD-30 Royal Blue Enamel | Premium DECORE Acrylic Enamel Interior/Exterior Waterborne Enamel PD-30 Royal Blue, available from Tru Value Hardware, St. Paul, MN |

Test Methods

Release Force and Re-adhesion Testing

This peel adhesion test is similar to the test method described in ASTM D 3330-90 except that the stainless steel substrate was replaced by a glass substrate.

A 24 mm wide strip of Tape 1 was adhered to the release layer of a release coated backing, prepared as described in the Examples below, using a 2-kilogram (kg) hard rubber roller passed back and forth twice over the strip.

The assembly was allowed to dwell for 1 week at RT (room temperature) or for 1 day at 50° C. (heat aged). Samples were prepared for release testing by attaching the non-release side of the backing layer (KC S-90104) to a glass plate using Tape 2.

The release force was measured using an IMASS slip/peel tester (Model 3M90, commercially available from Instrumentors Inc., Strongsville, Ohio) at a peel angle of 180° and a peel rate of 2.3 m/minute (90 in./minute).

Re-adhesion values were measured by taking the tapes peeled from the release surface and rolling them onto a clean glass plate. The re-adhesion samples were then peeled on the IMASS slip/peel tester (Model 3M90) at a peel angle of 180° and a peel rate of 2.3 m/minute (90 in./minute).

Paint De-wetting and Flaking Test

Samples were prepared for testing by brushing PD-30 Royal Blue Enamel paint onto the release-coated side of the KC S-90104 backing layer using a 2.54 cm (1 in.) wide natural boar bristle brush (Part no. 1500, commercially available from Dalco Enterprises, Inc., New Brighton, Minn.). The brush was dipped into the enamel paint until half of the bristle length was immersed into the paint. One side of the brush was wiped on the edge of the paint container to remove excess paint, and the brush was then used to deposit the paint onto the release-coated side of the backing layer with about 6 strokes back and forth. The painted area was about 3.8 cm (1.5 in.) wide and about 30.5 cm (12 in.) long. The samples were visually examined and de-wetting of the sample by the paint was recorded as "Yes" if the surface was de-wetted by the paint and "No" if the surface was not de-wetted by the paint.

The samples were allowed to dry for about 16 hours at 22° C. (72° F.) and 50% relative humidity. A 2.54 cm (1 in.) width piece was cut with a slitter from each sample. Tape 2 was placed on the unpainted side of the cut piece and the cut piece was placed on a glass plate and rolled down with 2 passes of a rubber roller. The bonded assembly dwelled at room temperature for about one minute and was peeled at a 180° peel angle using an IMASS slip/peel tester (Model 3M90) at a rate of 2.3 m/minute (90 in./minute). The samples were visually examined and the percent of paint flaking was estimated.

180° Peel Adhesion

This peel adhesion test is similar to the test method described in ASTM D 3330-90.

24 mm wide by about 20 mm long strips of Tape 1 were adhered to the release coated backings, prepared as described in the Examples below, using a 2-kilogram roller passed back and forth twice over each strip. The assembly was then attached to a glass plate using Tape 2, allowed to dwell at room temperature for about one minute, and Tape 1 was peeled at 180° peel adhesion using an IMASS slip/peel tester (Model 3M90) at a peel rate of 0.51 cm/minute (0.2 in./minute), 1.0 cm/minute (0.4 in./minute), 2.0 cm/minute (0.8 in./minute), 8.1 cm/minute (3.2 in./minute), 32.5 cm/minute (12.8 in./minute) or 2.3 m/minute (90 in./minute), as specified in the Examples, over various data collection times: 23 seconds for peel rates 0.51, 1.0, 2.0, and 8.1 cm/minute; 10 seconds for peel rate 32.5 cm/minute; and 5 seconds for peel rate 2.3 m/minute. Two or three measurements were taken at each peel rate; the reported peel adhesion value is an average of the measurements.

Example 1

Preparation of Release Material 1

MeFBSEA was prepared by essentially following the procedure described in U.S. Pat. No. 6,664,354 (Savu et al.) Example 2, Part A & B.

5.40 g ODA, 3.24 g ACN, 1.20 g AA, 0.36 g MA, 1.80 g MeFBSEA, 28.0 g ethyl acetate, and 0.072 g VAZO 67 were placed in a 4 oz. bottle. The bottle was purged with nitrogen, capped and tumbled in a water bath at 65° C. After 24 hours, an additional 0.048 g of VAZO 67 was added to the bottle, which was placed back into the 65° C. water bath for another 48 hours to form a solvent solution of polymer FC-1.

6.66 g of the FC-1 solvent-based polymer solution were added to a glass vial containing a TEFLON stir bar. 0.5 g triethylamine, 4.0 g isopropyl alcohol, and 18 g deionized water were added to the glass vial, in the order stated, with stirring. The open vial was placed on a combination stir/hot plate, and heated, to drive off the ethyl acetate, isopropyl alcohol and excess triethylamine, until the temperature of the dispersion reached 98° C. The concentration of the inverted water-based dispersion of FC-1 was measured to be 12 wt % solids.

The inverted water-based dispersion of FC-1 was further diluted with deionized water to 6% by wt. solids and then 0.01 wt % SILWET L-77, based on the solids content of FC-1, was added to form Release Material 1.

Preparation of Release Coated Backing

RHOPLEX GL-618 was diluted with deionized water to 35% by wt. solids content and coated onto KC S-90104 paper backing layer using a #6 coating rod. The coated paper was dried for 2 minutes at 100° C.

Release Material 1 prepared above was coated over the RHOPLEX GL-618 using a #6 coating rod. The release-coated sample was then dried for 2 minutes at 150° C. to provide a release coated backing.

The release coated backing was tested for Release Force, Re-adhesion, Paint De-wetting and Flaking, and 180° Peel Adhesion using the test methods described above. The results are shown in Tables 1 and 2.

Example 2

Preparation of Release Material 2

MeFBSEMA was prepared by essentially following the procedure described in U.S. Pat. No. 6,664,354 (Savu et al.), Example 2, Part A & B, except using methacrylic acid instead of acrylic acid.

6.00 g ODA, 3.24 g ACN, 1.20 g AA, 0.36 g MA, 1.20 g MeFBSEMA, 28.0 g ethyl acetate, and 0.072 g VAZO 67 were placed in a 4 oz. bottle. The bottle was purged with nitrogen, capped and tumbled in a water bath at 65° C. After 24 hours, an additional 0.048 g of VAZO 67 was added to the bottle, which was placed back into the 65° C. water bath for another 48 hours to form a solvent-based solution of polymer FC-2.

6.66 g of the FC-2 solvent-based polymer solution were added to a glass vial containing a TEFLON stir bar. 0.5 g triethylamine, 4.0 g isopropyl alcohol, and 18 g deionized water were added, in the order stated, with stirring. The open vial was placed on a combination stir/hot plate, and heated, to drive off the ethyl acetate, isopropyl alcohol and excess triethylamine, until the temperature of the dispersion reached 98° C. The concentration of the inverted water-based dispersion of FC-2 was measured to be 12 wt %. solids.

The inverted water-based dispersion of FC-2 was further diluted with deionized water to 6% by wt. solids and then 0.01 wt % SELWET L-77, based on total solids content of FC-2, was added to form Release Material 2.

Preparation of Release Coated Backing

A release coated backing was prepared according to the procedure of Example 1 except that Release Material 2 was used in place of Release Material 1.

The release coated backing was tested for Release Force, Re-adhesion, Paint De-wetting and Flaking, and 180° Peel Adhesion using the test methods described above. The results are shown in Tables 1 and 2.

Example 3

Preparation of Release Material 3

100 parts by wt. of 12% FC-1 inverted water-based dispersion and 51 parts by wt. 55% (as received) AIRFLEX 100HS emulsion were shaken together in a vial.

The FC-1/AIRFLEX 100HS mixture was further diluted with deionized water to 6% by wt. solids and then 0.01 wt % SILWET L-77, based on total solids content of FC-1/AIRFLEX 100HS mixture, was added to form Release Material 3.

Preparation of Release Coated Backing

A release coated backing was prepared according to the procedure of Example 1 except that Release Material 3 was used in place of Release Material 1.

The release coated backing was tested for Release Force, Re-adhesion, Paint De-wetting and Flaking, and 180° Peel Adhesion using the test methods described above. The results are shown in Tables 1 and 2.

Example 4

Preparation of Release Material 4

100 parts by wt. of 12% FC-2 inverted water-based dispersion and 51 parts by wt. 55% (as received) AIRFIEX 100HS emulsion were shaken together in a vial.

The FC-2/AIRFLEX 100HS mixture was further diluted with deionized water to 6% by wt. solids and then 0.01 wt % SILWET L-77, based on total solids content of FC-2/AIRFLEX 100HS mixture, was added to form Release Material 4.

Preparation of Release Coated Backing

A release coated backing was prepared according to the procedure of Example 1 except that Release Material 4 was used in place of Release Material 1.

The release coated backing was tested for Release Force, Re-adhesion, Paint De-wetting and Flaking, and 180° Peel Adhesion using the test methods described above. The results are shown in Tables 1 and 2.

Comparative Example 1

Preparation of Release Material C-1

A 22-liter flask equipped with an agitator, temperature controller with three heat lamps, condenser, nitrogen inlet and vacuum regulator was charged with 1451 g ODA solution (62.4% ODA in ethyl acetate), 452.4 g ACN, 156 g AA, 46.8 g MA, 23.4 g VAZO 67 and 3094 g ethyl acetate. The resulting mixture was heated to 65° C. while stirring. The reaction was carried out for 36 hours to form a solvent-based solution of polymer AP-1. The % solids were measured to be 29.3%.

A separate 22-liter flask equipped with an agitator, temperature controller, condenser, nitrogen inlet and vacuum regulator was charged with 3000 g of above prepared 29.3% AP-1 solvent-based solution, 6380 g deionized water and 122 g triethyl amine. The resulting dispersion was subjected to vacuum strip from 300 to 85 mm Hg and 35° C. to 55° C. to strip off ethyl acetate. After the solvent stopped coming off, heating and vacuum strip were stopped. The % solids of the resulting somewhat hazy inverted water-based dispersion of AP-1 was measured to be 12% and the pH was measured to be 7.90.

The inverted water-based dispersion of AP-1 was diluted with water to 6% by wt. solids and then 0.01 wt % SILWET L-77, based on total solids content of AP-1, was added to form Release Material C-1.

A release coated backing was prepared according to the procedure of Example 1 except that Release Material C-1 was used in place of Release Material 1.

The release coated backing was tested for Release Force, Re-adhesion, Paint De-wetting and Flaking, and 180° Peel Adhesion using the test methods described above. The results are shown in Tables 1 and 2.

Comparative Example 2

Preparation of Release Material C-2

100 parts by wt. of 12% AP-1 inverted water-based dispersion and 51 parts by wt. 55% AIRFLEX 100HS emulsion were shaken together in a vial.

The AP-1/AIRFLEX 100HS mixture was further diluted with deionized water to 6% by wt. solids and then 0.01 wt % SILWET L-77, based on total solids content of AP-1/AIRFLEX 100HS mixture, was added to form Release Material C-2.

Preparation of Release Coated Backing

A release coated backing was prepared according to the procedure of Example 1 except that Release Material C-2 was used in place of Release Material 1.

The release coated backing was tested for Release Force, Re-adhesion, Paint De-wetting and Flaking, and 180° Peel Adhesion using the test methods described above. The results are shown in Tables 1 and 2.

TABLE 1

| Ex. No. | Paint Dewetting | Paint Flaking, % | Release Force after RT 1 week, N/dm (oz/24 mm) | Release Force after 50° C. 1 day, N/dm (oz/24 mm) | Re-adhesion Force after RT 1 week, N/dm (oz/24 mm) | Re-adhesion Force after 50° C. 1 day, N/dm (oz/24 mm) |
|---|---|---|---|---|---|---|
| 1 | No | 0 | 23.5 (20.3) | 26.5 (22.9) | 47.1 (40.7) | 46.7 (40.3) |
| 2 | No | 0 | 22.6 (19.5) | 24.2 (20.9) | 47.6 (41.1) | 45.5 (39.3) |
| 3 | No | 0 | 25.8 (22.3) | 32.3 (27.9) | 48.1 (41.5) | 45.6 (39.4) |
| 4 | No | 0 | 24.0 (20.7) | 32.8 (28.3) | 47.9 (41.4) | 44.7 (38.6) |
| Comp. Ex. 1 | No | 0 | 20.3 (17.5) | 21.1 (18.2) | 49.0 (42.3) | 46.6 (40.2) |
| Comp. Ex. 2 | No | 0 | 23.4 (20.2) | 27.2 (23.5) | 47.7 (41.2) | 46.2 (39.9) |

TABLE 2

| | 180° Peel Adhesion, N/dm (oz/24 mm) | | | | | |
|---|---|---|---|---|---|---|
| Ex. No. | Peel rate 0.51 cm/minute (0.2 in./minute) | Peel rate 1.0 cm/minute (0.4 in./minute) | Peel rate 2.0 cm/minute (0.8 in./minute) | Peel rate 8.1 cm/minute (3.2 in./minute) | Peel rate 32.5 cm/minute (12.8 in./minute) | Peel rate 2.3 m/minute (90 in./minute) |
| 1 | 3.1 (2.7) | 4.1 (3.5) | 5.4 (4.7) | 9.2 (7.9) | 11.7 (10.1) | 12.6 (10.9) |
| 2 | 3.8 (3.3) | 4.7 (4.0) | 6.2 (5.4) | 9.6 (8.3) | 12.4 (10.7) | 13.1 (11.3) |
| 3 | 3.4 (2.9) | 4.4 (3.8) | 5.6 (4.9) | 10.0 (8.6) | 12.8 (11.1) | 14.7 (12.7) |
| 4 | 3.9 (3.4) | 5.0 (4.3) | 6.5 (5.6) | 9.7 (8.4) | 12.5 (10.8) | 13.8 (12.0) |
| Comp. Ex. 1 | 1.2 (1.0) | 1.8 (1.6) | 3.0 (2.60) | 7.6 (6.5) | 10.9 (9.4) | 13.4 (11.5) |
| Comp. Ex. 2 | 1.1 (0.93) | 1.8 (1.5) | 3.0 (2.6) | 7.4 (6.4) | 11.7 (10.1) | 14.9 (12.8) |

Foreseeable modifications and alterations of this invention will be apparent to those skilled in the art without departing from the scope and spirit of this invention. This invention should not be restricted to the embodiments that are set forth in this application for illustrative purposes.

What is claimed:

1. A release polymer consisting of the reaction product of
   (a) from 1 to about 15 wt % of a fluorinated monomer selected from the group consisting of monomers according to the general formula:

$R_f$—X—OC(O)—C(R)=CH$_2$ wherein $R_f$ represents a perfluorinated aliphatic group having 3 or 4 carbon atoms, X is an organic divalent linking group, and R represents a hydrogen or methyl group;
   (b) from about 40 to about 70 wt % of an alkyl (meth)acrylate, wherein the alkyl group contains from 16 to 22 carbon atoms;
   (c) from about 3 to about 20 wt % of (meth)acrylic acid;
   (d) from about 20 to about 40 wt % acrylonitrile; and
   (e) from 0 to about 15 wt % of vinyl monomer, other than those of (a) through (d).

2. The release polymer according to claim 1 wherein $R_f$ has 4 carbon atoms.

3. The release polymer according to claim 1 wherein X is selected from the group consisting of alkylene, arylene, aralkylene, sulfonyl, sulfoxy, sulfonamide, carbonamido, carbonyloxy, urethanylene, ureylene, and combinations thereof.

4. The release polymer according to claim 1 wherein X is sulfonamidoalkylene.

5. The release polymer according to claim 1 wherein the alkyl (meth)acrylate is selected from the group consisting of octadecyl acrylate, octadecyl methacrylate, behenyl acrylate and combinations thereof.

6. The release polymer according to claim 1 wherein the vinyl monomer is selected from the group consisting of methyl (meth)acrylate, butyl (meth)acrylate, iso-octyl (meth)acrylate, 2-ethylhexyl (meth)acrylate, styrene, vinyl acetate, and combinations thereof.

7. The release polymer according to claim 1 wherein the fluorinated monomer is present in an amount of from about 1 to about 10 weight percent.

8. The release polymer according to claim 1 wherein the alkyl(meth)acrylate is present in an amount of from about 45 to about 60 wt %.

9. The release polymer according to claim 1 wherein the (meth)acrylic acid is present in an amount of from about 8 to about 12 wt %.

10. The release polymer according to claim 1 wherein the acrylonitrile is present in an amount of from about 25 to about 35 wt %.

* * * * *

UNITED STATES PATENT AND TRADEMARK OFFICE
CERTIFICATE OF CORRECTION

PATENT NO. : 7,253,241 B2  Page 1 of 1
APPLICATION NO. : 11/027602
DATED : August 7, 2007
INVENTOR(S) : Dizio et al.

It is certified that error appears in the above-identified patent and that said Letters Patent is hereby corrected as shown below:

Title Page, Item (57), (Abstract)
Line 7, delete "$R_fX$" and insert -- $R_f–X$ --, therefor.

Column 4
Line 60, delete "Poymers havinfa" and insert -- Polymers having a --, therefor.

Column 9
Line 14, delete "SELWET" and insert -- SILWET --, therefor.
Line 55, delete "AIRFIEX" and insert -- AIRFLEX --, therefor.

Column 11
Line 64, in Claim 2, delete "$R_r$" and insert -- $R_f$ --, therefor.

Signed and Sealed this

Twentieth Day of May, 2008

JON W. DUDAS
*Director of the United States Patent and Trademark Office*